United States Patent
Brookes

(10) Patent No.: US 9,221,531 B1
(45) Date of Patent: Dec. 29, 2015

(54) UNI-PENETRATION TENDON RETENTION AND FILL PORT SYSTEM FOR A BALLOON ENVELOPE

(71) Applicant: Google Inc., Mountain View, CA (US)

(72) Inventor: Kyle Brookes, Redwood City, CA (US)

(73) Assignee: Google Inc., Mountain View, CA (US)

( * ) Notice: Subject to any disclaimer, the term of this patent is extended or adjusted under 35 U.S.C. 154(b) by 63 days.

(21) Appl. No.: 14/153,020

(22) Filed: Jan. 11, 2014

(51) Int. Cl.
*B64B 1/62* (2006.01)

(52) U.S. Cl.
CPC .......................................... *B64B 1/62* (2013.01)

(58) Field of Classification Search
CPC .............. B64B 1/62; B64B 1/40; B64B 1/42; B64B 1/58; B64B 4/64; B64B 1/66; B64B 1/70; F16J 13/06; B64D 45/02
USPC ............................................................ 244/98
See application file for complete search history.

(56) References Cited

U.S. PATENT DOCUMENTS

| | | | | |
|---|---|---|---|---|
| 37,667 | A * | 2/1863 | Shaw | 244/127 |
| 897,666 | A * | 9/1908 | Sohiavone | 244/97 |
| 1,278,133 | A * | 9/1918 | Gammeter | 244/99 |
| 1,289,703 | A * | 12/1918 | Dutton | 244/99 |
| 1,615,016 | A * | 1/1927 | Kraft | 251/318 |
| 1,633,238 | A * | 6/1927 | Bassett | 244/97 |
| 2,779,554 | A | 1/1957 | Kizzek | |
| 2,877,042 | A * | 3/1959 | Schoessow | 292/256 |
| 2,919,082 | A * | 12/1959 | Winzen et al. | 244/31 |
| 4,332,547 | A * | 6/1982 | MacDonald, Jr. | 431/242 |
| 4,911,380 | A * | 3/1990 | Regipa | 244/31 |
| 2010/0012772 | A1 | 1/2010 | Izutsu et al. | |
| 2014/0158823 | A1* | 6/2014 | Smith et al. | 244/1 A |
| 2014/0353424 | A1* | 12/2014 | Ratner | 244/98 |

OTHER PUBLICATIONS

Smith, Michael S., et al., "Design and Test Results from the Ultra Long Duration Balloon Program," Raven Industries Inc. ISTS 20000-k-16, p. 1-7 (2000).

* cited by examiner

*Primary Examiner* — Christopher P Ellis
*Assistant Examiner* — Jessica Wong
(74) *Attorney, Agent, or Firm* — McDonnell Boehnen Hulbert & Berghoff LLP

(57) ABSTRACT

Methods and apparatus are disclosed for an apex fitting for securing to a high altitude balloon. An example apparatus involves: (a) a base plate defining an opening, where the base plate is configured to be securable to an exterior of a balloon envelope, (b) at least one stud coupled to the base plate and configured to be securable to a tendon, (c) a retention ring defining at least one opening configured to receive the at least one stud, (d) a fill-port body defining a cavity, wherein a flange is coupled to the fill-port body, wherein the fill-port body is arranged coaxially with and extends through the opening of the base plate such that the flange lies adjacent to the bottom surface of the base plate, and (e) a locking body coupled to the fill-port body, wherein the locking body defines an opening arranged coaxially with the fill-port body.

20 Claims, 11 Drawing Sheets

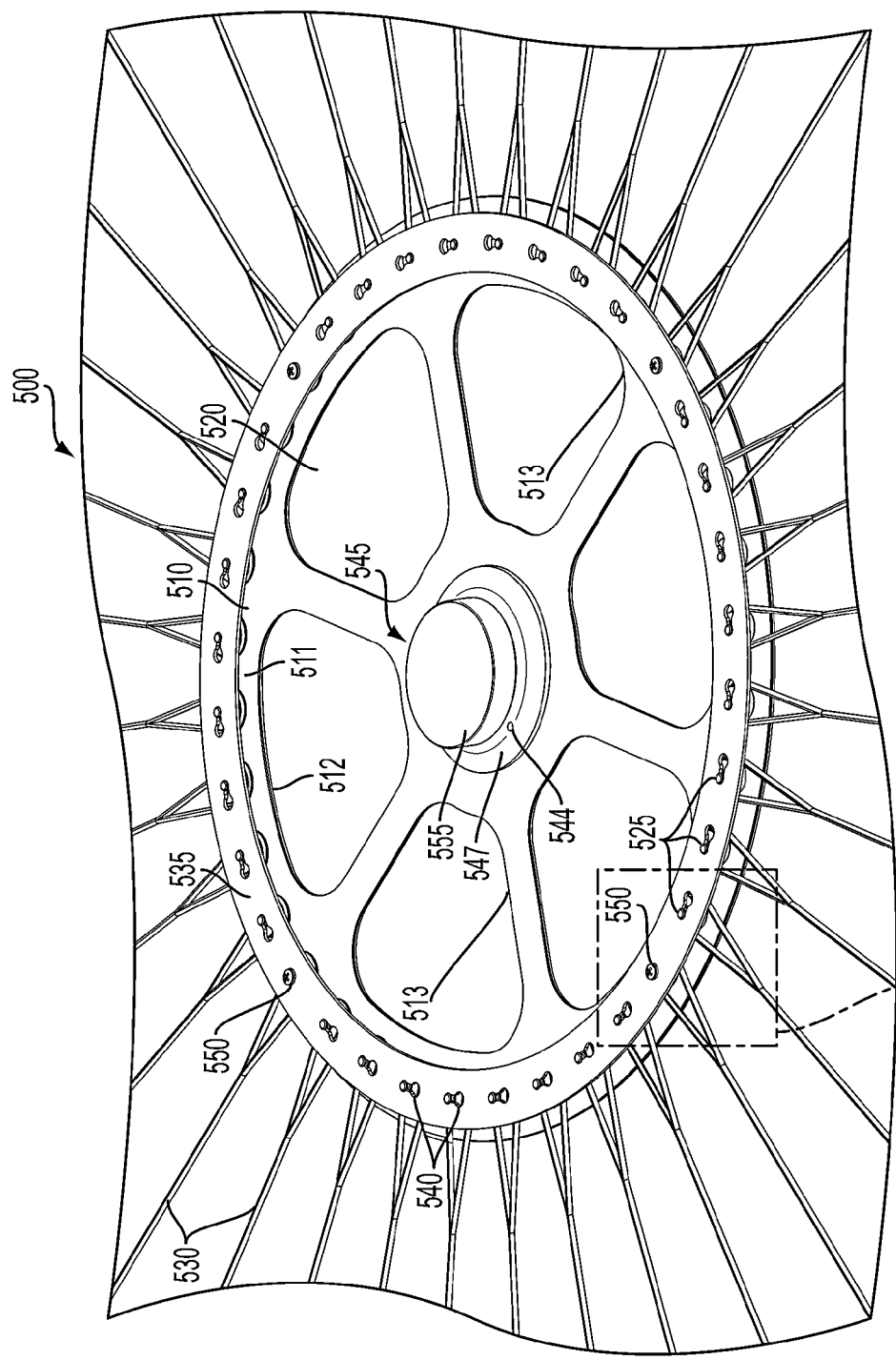

← 800

810
Affixing a base plate to a balloon envelope, wherein the balloon envelope defines an opening at an apex of the balloon envelope, wherein the base plate defines an opening, wherein the opening of the base plate is aligned with the opening of the balloon envelope, and wherein a plurality of studs are coupled to the base plate

↓

820
Placing a fill-port body through the opening of the balloon envelope and through the opening of the base plate such that a flange of the fill-port body lies adjacent to the balloon envelope

↓

830
Securing a locking body to the fill-port body and/or the base plate such that the locking body lies adjacent to the base plate

↓

840
Securing a plurality of tendons to the plurality of studs

↓

850
Securing a retention ring to the base plate

FIGURE 8

UNI-PENETRATION TENDON RETENTION AND FILL PORT SYSTEM FOR A BALLOON ENVELOPE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

An apex fitting described herein advantageously provides a base plate configured to be securable to the exterior of a balloon envelope via a single perforation through the balloon envelope. This arrangement may minimize air leaks from the balloon envelope. In addition, the base plate may be beneficially configured to be coupled to a retention ring without perforating the balloon envelope. The retention ring may further hold tendons in place at the apex of the balloon envelope. In addition, a fill-port body may be advantageously coupled to the base plate, rather than being coupled to the soft balloon envelope, to remove stress from the balloon envelope.

In one aspect, an example apparatus involves: (a) a base plate having a top surface and a bottom surface, wherein the base plate defines an opening, and wherein the base plate is configured to be securable to an exterior of a balloon envelope, (b) at least one stud coupled to the base plate, wherein the at least one stud is configured to be securable to a tendon, (c) a retention ring defining at least one opening configured to receive the at least one stud, (d) a fill-port body defining a cavity, wherein a flange is coupled to the fill-port body, wherein the fill-port body is arranged coaxially with and extends through the opening of the base plate such that the flange lies adjacent to the bottom surface of the base plate, and (e) a locking body coupled to the fill-port body, wherein the locking body defines an opening arranged coaxially with the fill-port body, wherein the fill-port body extends through the opening of the locking body such that a portion of the locking body lies adjacent to the top surface of the base plate.

In another aspect, an example method involves: (a) affixing a base plate to a balloon envelope, wherein the balloon envelope defines an opening at an apex of the balloon envelope, wherein the base plate defines an opening, wherein the opening of the base plate is aligned with the opening of the balloon envelope, and wherein a plurality of studs are coupled to the base plate, (b) placing a fill-port body through the opening of the balloon envelope and through the opening of the base plate such that a flange of the fill-port body lies adjacent to the balloon envelope, (c) securing a locking body to the fill-port body and/or the base plate such that the locking body lies adjacent to the base plate, (d) securing a plurality of tendons to the plurality of studs, and (e) securing a retention ring to the base plate.

In a further aspect, a balloon is provided having a balloon envelope and means for retaining tendons at the apex of a balloon envelope and means for filling the balloon envelope with air.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 5A is a perspective view of an example apparatus, according to an example embodiment.

FIG. 8 is a flow chart of a method according to an example embodiment.

DETAILED DESCRIPTION

Figure 1:
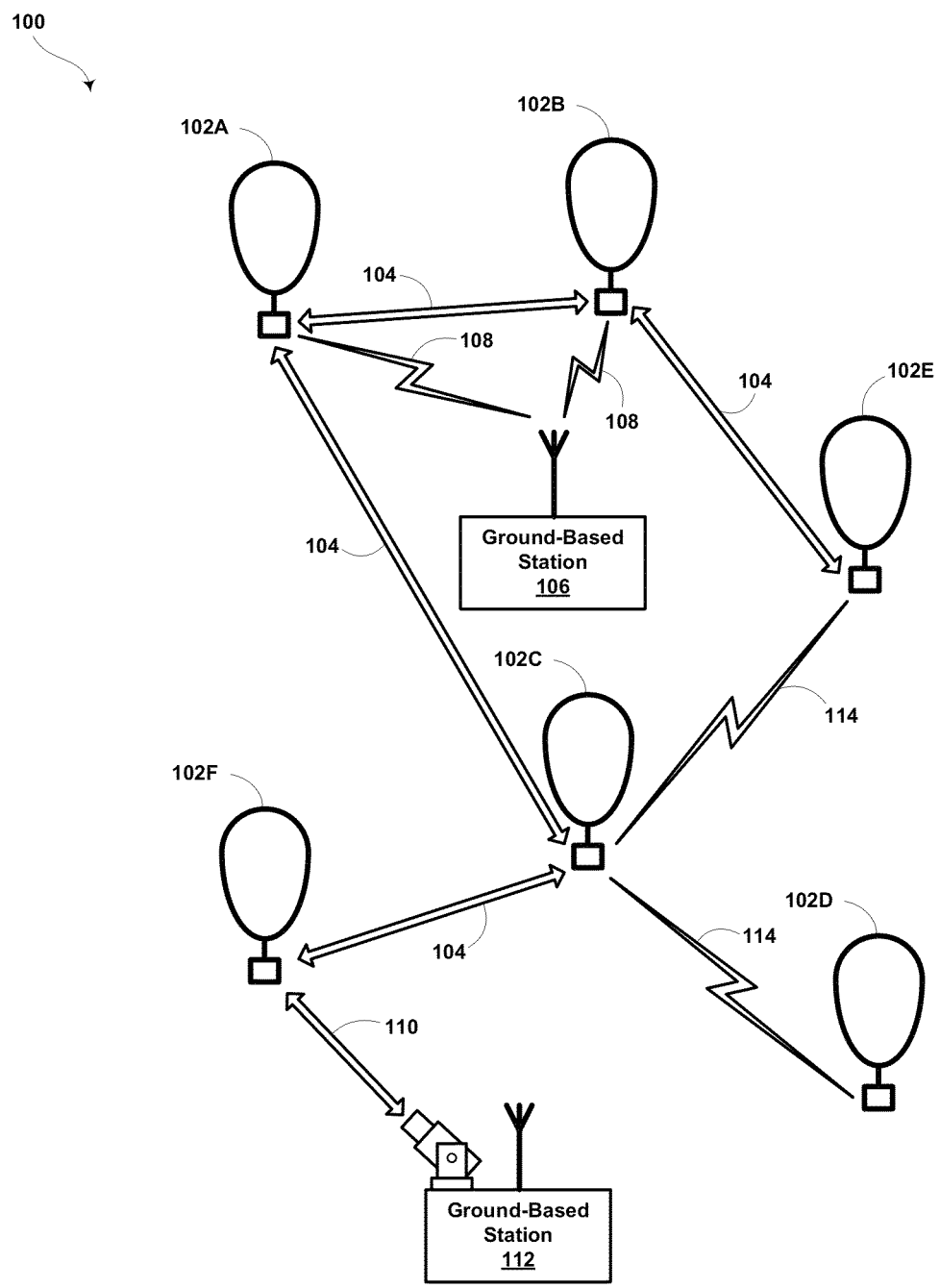
FIG. 1 is a simplified diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. OVERVIEW

Example embodiments disclosed herein may generally relate to a data network formed by balloons, and in particular, to a mesh network formed by high-altitude balloons deployed in the stratosphere. In some applications, it may be desirable for high altitude balloons to retain lift gas for one hundred days or more. Example balloons may be configured to have a top chamber to receive and retain lift gas and a bottom chamber to receive and retain air. In one embodiment, neither chamber may initially contain perforations, but a hole may be defined in the balloon envelope to receive a fill port to administer lift gas and fill the balloon envelope. The present invention may also be used with balloons that are made of a number of gores seamed together resulting in holes at the apex and base of the balloon, for example, among other possibilities.

Example embodiments may advantageously provide a single perforation in the top chamber of the balloon envelope. This advantage may be accomplished by relocating the rigid fill port from the soft film of the balloon to a rigid base plate at the apex of the balloon envelope such that the fill port is the only perforation in the balloon envelope in communication with lift gas. Placing the fill port in the base plate beneficially removes stress from the balloon envelope.

In addition, example embodiments may advantageously provide a base plate that may be securable to the exterior of a balloon envelope via the single perforation. For example, the base plate may be initially secured to the balloon envelope via tape or adhesive. The base plate may define a plurality of studs configured to be coupled to the ends of a plurality of tendons. The opposite ends of the plurality of tendons may be coupled to a fitting on the underside of the balloon for film-load assistance when the balloon is pressurized. Once the balloon is pressurized, friction between the tendons and the outward pressing envelope may be great enough to hold the apex fitting in place. Known apex fittings typically have over forty perforations in the balloon envelope and the base plate. Each perforation is a source for potential air leaks from the balloon envelope. Thus, the single perforation of the present invention has the benefit of minimizing air leaks.

To ensure the tendons stay in place, a retention ring may be coupled to the base plate, such that the tendon loops are sandwiched in between the base plate and the retention ring. The retention ring defines a plurality of openings configured to receive the plurality of studs. Each stud may have a body and a flange coupled to the free end of the body. The plurality of openings in the retention ring may each have a first portion sized to receive the flange of a corresponding stud and a second portion defining a channel having a width narrower than a diameter of the flange. This arrangement allows the first portion of the openings to slide over the flange of the studs and down to the body of the studs. The retention ring may then be rotated such that the body of the studs is received in the second portion of the openings, locking the retention ring in place. One or more locking pins may then be disposed through the retention ring to prevent the retention ring from rotating to an unlocked position.

In some embodiments, the base plate may define one or more apertures or windows therein, which advantageously reduces the weight of the apex fitting. In addition, the base plate may beneficially include electrical passages for coupling to one or more sensors.

2. EXAMPLE BALLOON NETWORKS

In an example balloon network, the balloons may communicate with one another using free-space optical communications. For instance, the balloons may be configured for optical communications using ultra-bright LEDs (which are also referred to as "high-power" or "high-output" LEDs). In some instances, lasers could be used instead of or in addition to LEDs, although regulations for laser communications may restrict laser usage. In addition, the balloons may communicate with ground-based station(s) using radio-frequency (RF) communications.

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with nearby balloons via free-space optical links. Further, some or all of the balloons in such a network, may also be configured to communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. Some balloons may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context.

In such a configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations. Other differences could be present between balloons in a heterogeneous balloon network.

FIG. 1 is a simplified diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, balloons 102A to 102F may be configured for RF communications with ground-based stations 106 and 112 via RF links 108. In another example embodiment, balloons 102A to 102F could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has lower winds (e.g., between 5 and 20 miles per hour (mph)).

More specifically, in a high-altitude-balloon network, balloons 102A to 102F may generally be configured to operate at altitudes between 17 km and 25 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 25 km may vary with latitude and by season, the variations can be modelled in a reasonably accurate manner. Additionally, altitudes above 17 km are typically above the maximum flight level designated for commercial air traffic. Therefore, interference with commercial flights is not a concern when balloons are deployed between 17 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication ground-based stations 106 and 112 via RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F could be configured as a downlink balloon. Like other balloons in an example network, a downlink balloon 102F may be operable for optical communication with other balloons via optical links 104. However, downlink balloon 102F may also be configured for free-space optical communication with a ground-based station 112 via an optical link 110. Optical link 110 may therefore serve as a high-capacity link (as compared to an RF link 108) between the balloon network 100 and a ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which provides an RF link with substantially the same capacity as the optical links 104. Other forms are also possible.

Balloons could be configured to establish a communication link with space-based satellites in addition to, or as an alternative to, a ground-based communication link.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order communicate with a balloon 102A to 102F over an RF link 108. As such, ground-based stations 106 and 112 may be configured as an access point with which various devices can connect to balloon network 100. Ground-based stations 106 and 112 may have other configurations and/or serve other purposes without departing from the scope of the invention.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular Quality of Service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
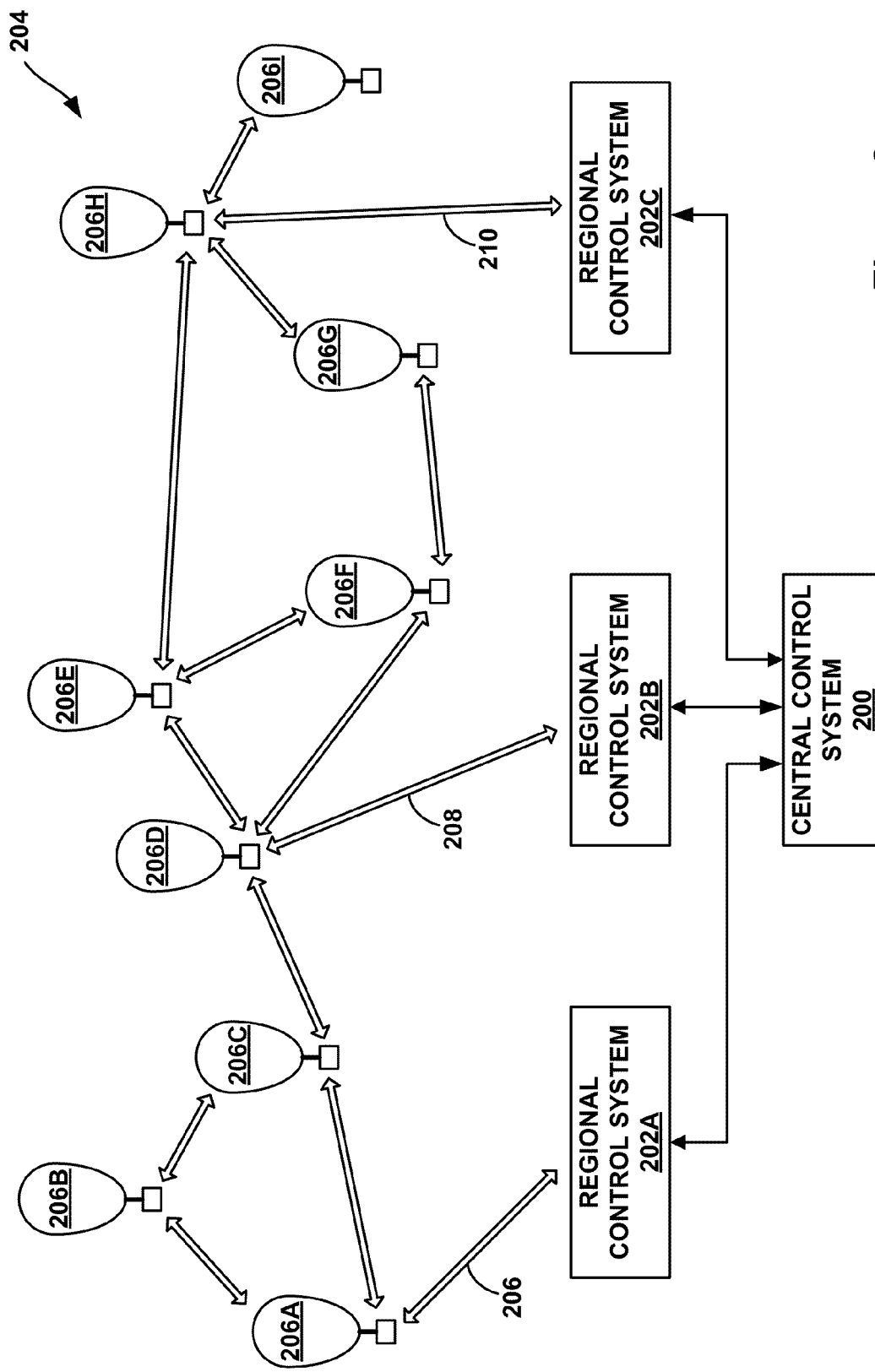
FIG. 2 is a diagram illustrating a balloon-network control system, according to an example embodiment.

In some embodiments, mesh networking and/or station-keeping functions may be centralized. For example, FIG. 2 is a diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, where only some of balloons 206A to 206I are configured as downlink balloons, the balloons 206A, 206F, and 206I that are configured as downlink balloons may function to relay communications from central control system 200 to other balloons in the balloon network, such as balloons 206B to 206E, 206G, and 206H. However, it should be understood that it in some implementations, it is possible that all balloons may function as downlink balloons. Further, while FIG. 2 shows multiple balloons configured as downlink balloons, it is also possible for a balloon network to include only one downlink balloon.

Note that a regional control system 202A to 202C may in fact just be a particular type of ground-based station that is configured to communicate with downlink balloons (e.g. the ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in the balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. A distributed-control arrangement may be useful in other scenarios as well.

Further, it should be understood that other control-system arrangements are possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared between a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_j$, wherein $d_j$ is proportional to the distance to the second nearest neighbor balloon, for instance.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
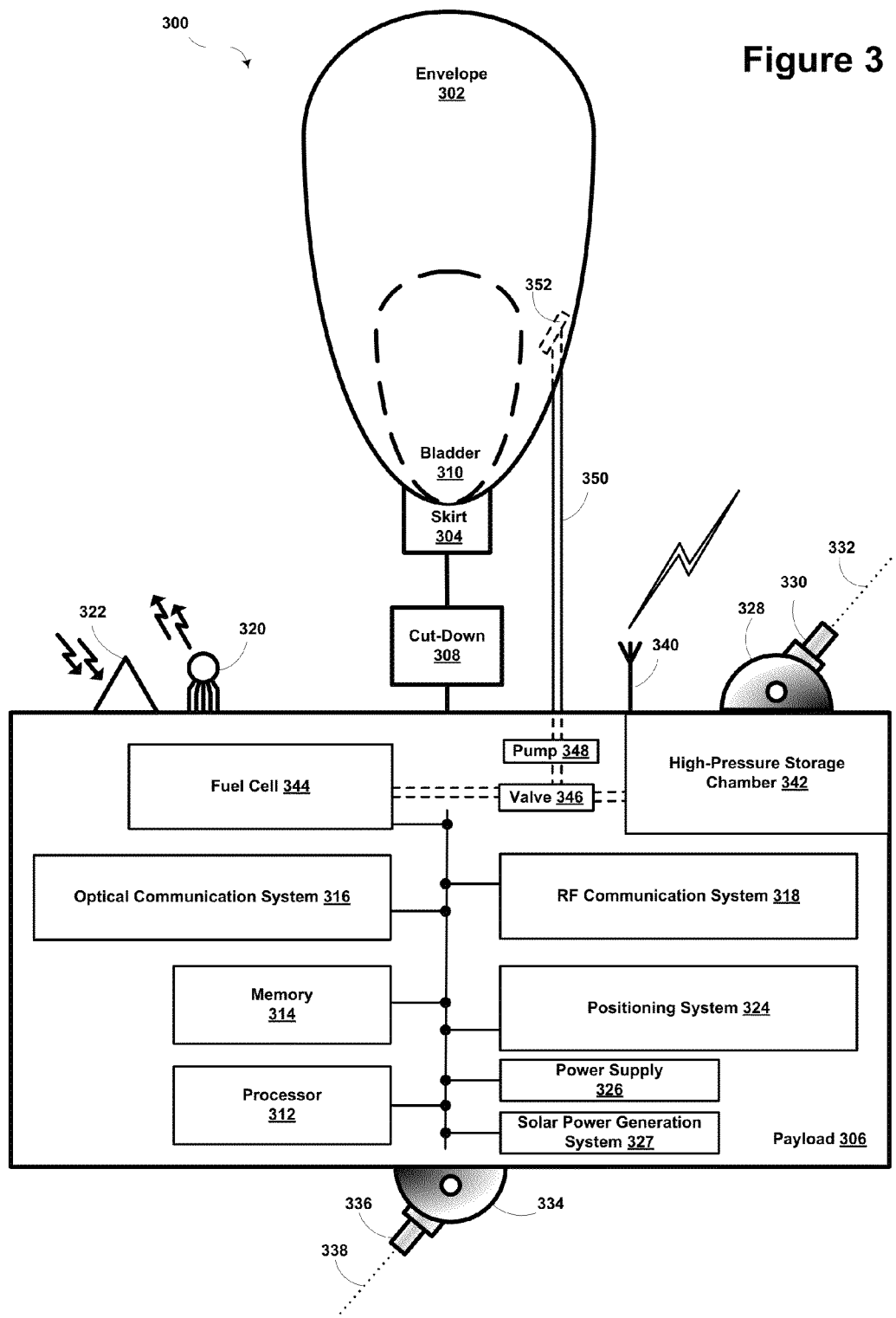
FIG. 3 is a simplified diagram illustrating a high-altitude balloon, according to an example embodiment.

Various types of balloon systems may be incorporated in an example balloon network. As noted above, an example embodiment may utilize high-altitude balloons, which could typically operate in an altitude range between 17 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. In one example embodiment, the envelope and/or skirt could be made of metalized Mylar or BoPet. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by power supply 326.

Further, payload 306 may include various types of other systems and sensors 328. For example, payload 306 may include one or more video and/or still cameras, a GPS system, various motion sensors (e.g., accelerometers, magnetometers, gyroscopes, and/or compasses), and/or various sensors for capturing environmental data. Further, some or all of the components within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a ridged bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In other embodiments, in-flight balloons may be serviced by specific service balloons or another type of aerostat or aircraft.

In a further aspect, balloon 300 includes a gas-flow system, which may be used for altitude control. In the illustrated example, the gas-flow system includes a high-pressure storage chamber 342, a gas-flow tube 350, and a pump 348, which may be used to pump gas out of the envelope 302, through the gas-flow tube 350, and into the high-pressure storage chamber 342. As such, balloon 300 may be configured to decrease its altitude by pumping gas out of envelope 302 and into high-pressure storage chamber 342. Further, balloon 300 may be configured to move gas into the envelope and increase its altitude by opening a valve 352 at the end of gas-flow tube 350, and allowing lighter-than-air gas from high-pressure storage chamber 342 to flow into envelope 302.

Note that the high-pressure storage chamber 342, in an example balloon, may be constructed such that its volume does not change due to, e.g., the high forces and/or torques resulting from gas that is compressed within the chamber. In an example embodiment, the high-pressure storage chamber 342 may be made of a material with a high tensile-strength to weight ratio, such as titanium or a composite made of spun carbon fiber and epoxy. However, high-pressure storage chamber 342 may be made of other materials or combinations of materials, without departing from the scope of the invention.

In a further aspect, balloon 300 may be configured to generate power from gas flow out of high-pressure storage chamber 342 and into envelope 302. For example, a turbine (not shown) may be fitted in the path of the gas flow (e.g., at the end of gas-flow tube 350). The turbine may be a gas turbine generator, or may take other forms. Such a turbine may generate power when gas flows from high-pressure storage chamber 342 to envelope 302. The generated power may be immediately used to operate the balloon and/or may be used to recharge the balloon's battery.

In a further aspect, a turbine, such as a gas turbine generator, may also be configured to operate "in reverse" in order to pump gas into and pressurize the high-pressure storage chamber 342. In such an embodiment, pump 348 may be unnecessary. However, an embodiment with a turbine could also include a pump.

In some embodiments, pump 348 may be a positive displacement pump, which is operable to pump gas out of the envelope 302 and into high-pressure storage chamber 342. Further, a positive-displacement pump may be operable in reverse to function as a generator.

Further, in the illustrated example, the gas-flow system includes a valve 346, which is configured to adjust the gas-flow path between envelope 302, high-pressure storage chamber 342, and fuel cell 344. In particular, valve 346 may adjust the gas-flow path such that gas can flow between high-pressure storage chamber 342 and envelope 302, and shut off the path to fuel cell 344. Alternatively, valve 346 may shut off the path high-pressure storage chamber 342, and create a gas-flow path such that gas can flow between fuel cell 344 and envelope 302.

Balloon 300 may be configured to operate fuel cell 344 in order to produce power via the chemical reaction of hydrogen and oxygen to produce water, and to operate fuel cell 344 in reverse so as to create hydrogen and oxygen from water. Accordingly, to increase its altitude, balloon 300 may run fuel cell 344 in reverse so as to generate gas (e.g., hydrogen gas), which can then be moved into the envelope to increase buoyancy. Specifically, balloon may increase its altitude by running fuel cell 344 in reverse, adjusting valve 346 and valve 352 such that hydrogen gas produced by fuel cell 344 can flow from fuel cell 344, through gas-flow tube 350, and into envelope 302.

To run fuel cell 344 "in reverse," balloon 300 may utilize an electrolysis mechanism in order to separate water molecules. For example, a balloon may be configured to use a photocatalytic water splitting technique to produce hydrogen and oxygen from water. Other techniques for electrolysis are also possible.

Further, balloon 300 may be configured to separate the oxygen and hydrogen produced via electrolysis. To do so, the fuel cell 344 and/or another balloon component may include an anode and cathode that attract the positively and negatively charged O- and H-ions, and separate the two gases. Once the gases are separated, the hydrogen may be directed into the envelope. Additionally or alternatively, the hydrogen and/or oxygen may be moved into the high-pressure storage chamber.

Further, to decrease its altitude, balloon 300 may use pump 348 to pump gas from envelope 302 to the fuel cell 344, so that the hydrogen gas can be consumed in the fuel cell's chemical reaction to produce power (e.g., the chemical reaction of hydrogen and oxygen to create water). By consuming the hydrogen gas the buoyancy of the balloon may be reduced, which in turn may decrease the altitude of the balloon.

It should be understood that variations on the illustrated high-pressure storage chamber are possible. For example, the high-pressure storage chamber may take on various sizes and/or shapes, and be constructed from various materials, depending upon the implementation. Further, while high-pressure storage chamber 342 is shown as part of payload 306, high-pressure storage chamber could also be located inside of envelope 302. Yet further, a balloon could implement multiple high-pressure storage chambers. Other variations on the illustrated high-pressure storage chamber 342 are also possible.

It should also be understood that variations on the illustrated air-flow tube 350 are possible. Specifically, any configuration that facilitates movement of gas between the high-pressure storage chamber and the envelope is possible.

Yet further, it should be understood that a balloon and/or components thereof may vary from the illustrated balloon 300. For example, some or all of the components of balloon 300 may be omitted. Components of balloon 300 could also be combined. Further, a balloon may include additional components in addition or in the alternative to the illustrated components of balloon 300. Other variations are also possible.

3. BALLOON NETWORK WITH OPTICAL AND RF LINKS BETWEEN BALLOONS

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
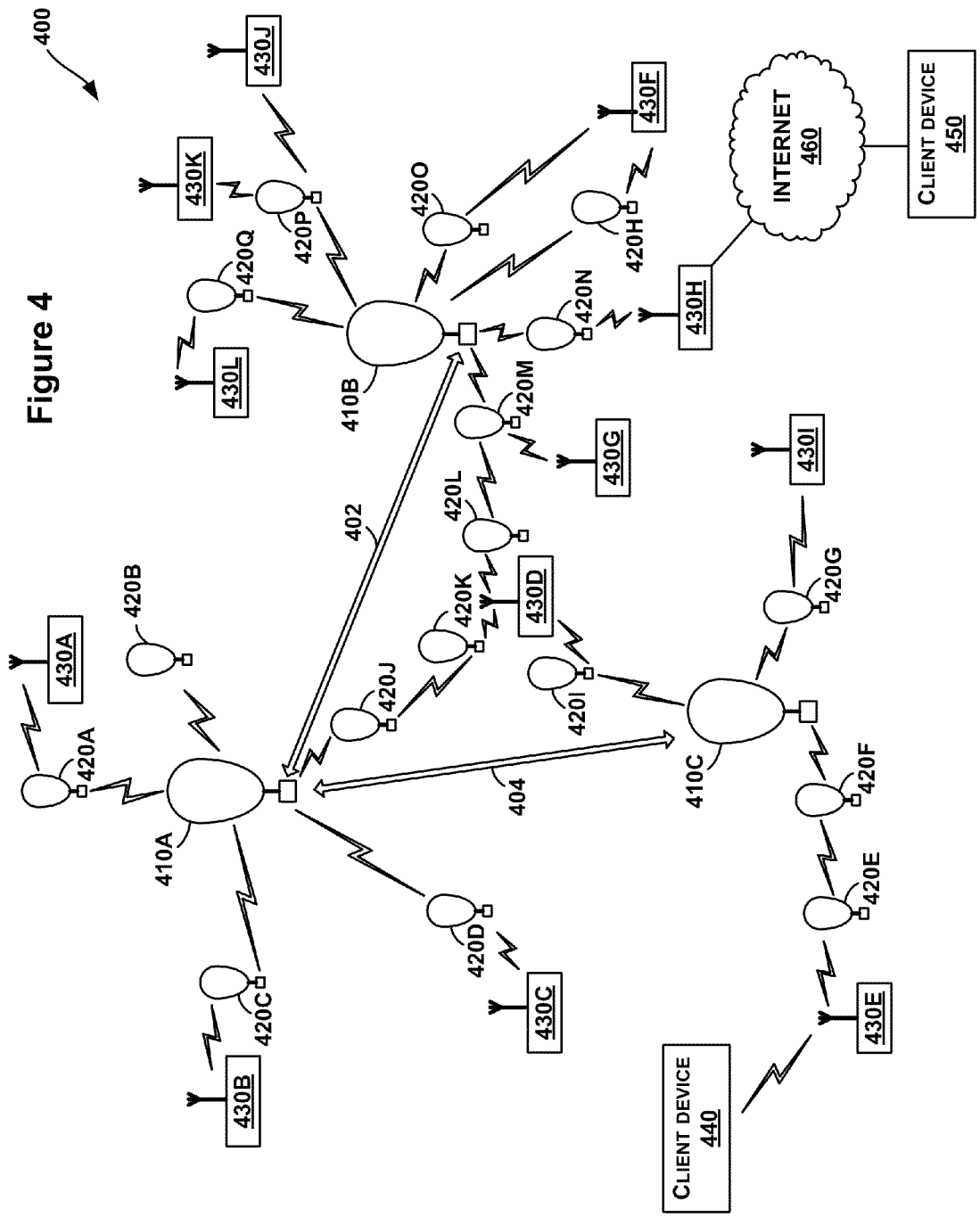
FIG. 4 is a simplified diagram illustrating a balloon network that includes super-nodes and sub-nodes, according to an example embodiment.
Figure 5B:
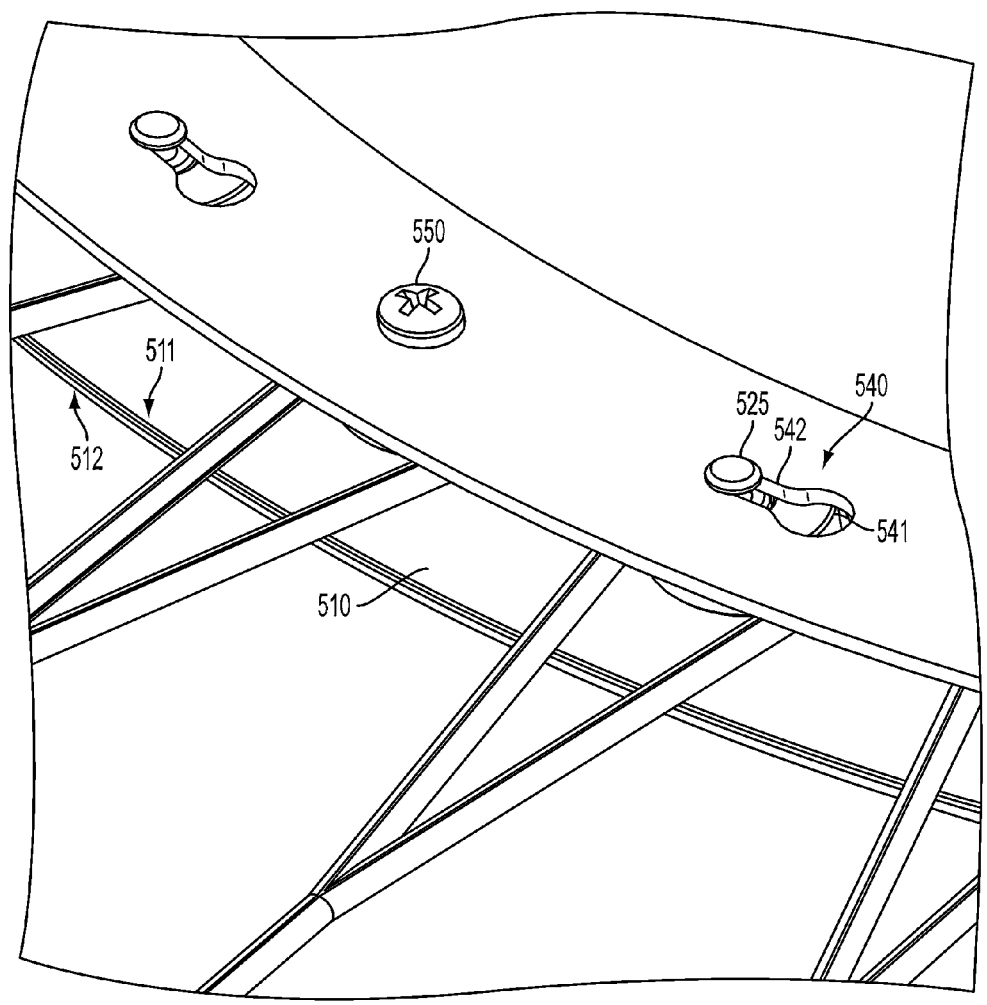
FIG. 5B is a detail view of the example apparatus shown in FIG. 5A.
Figure 6A:
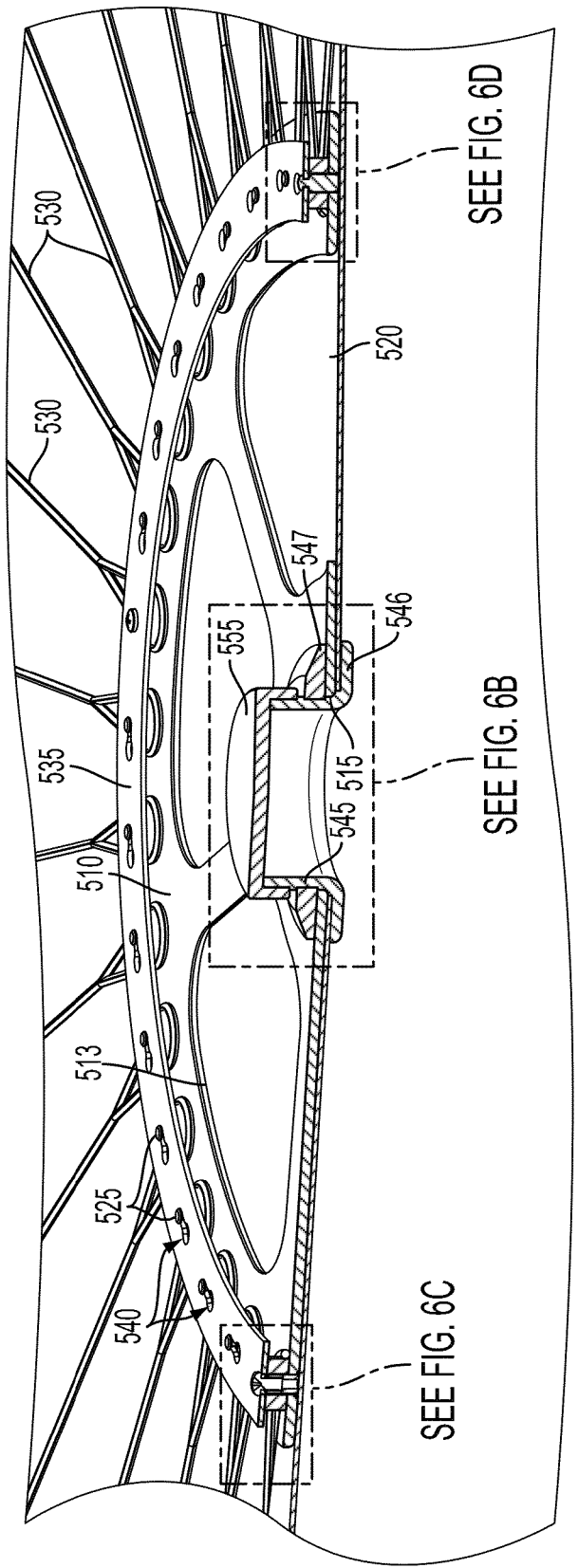
FIG. 6A is a cross-sectional side view of the example apparatus shown in FIG. 5A.
Figure 6B:
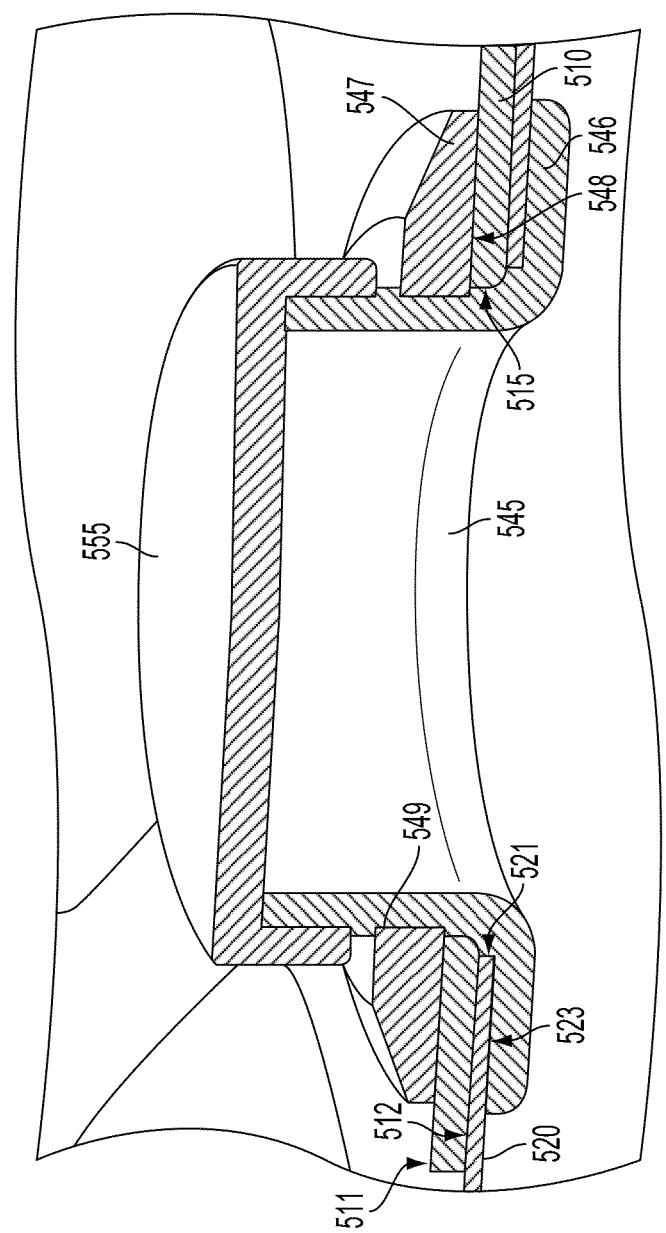
FIG. 6B is a detail cross-sectional side view a fill-port body of the example apparatus shown in FIG. 6A.
Figure 6C:
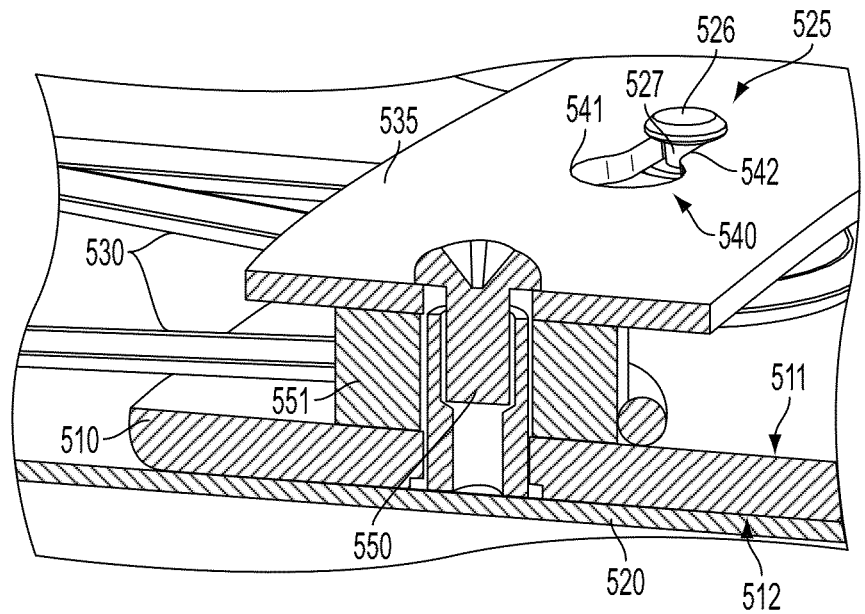
FIG. 6C is a detail cross-sectional side view of an example locking pin of the example apparatus shown in FIG. 6A.
Figure 6D:
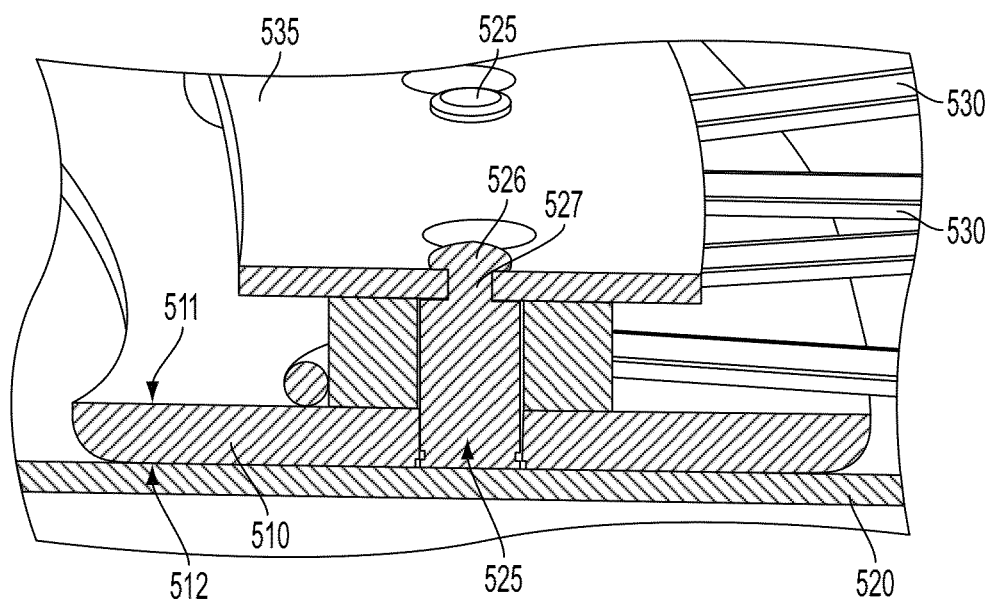
FIG. 6D is a detail cross-sectional side view of an example stud of the example apparatus shown in FIG. 6A.
Figure 7:
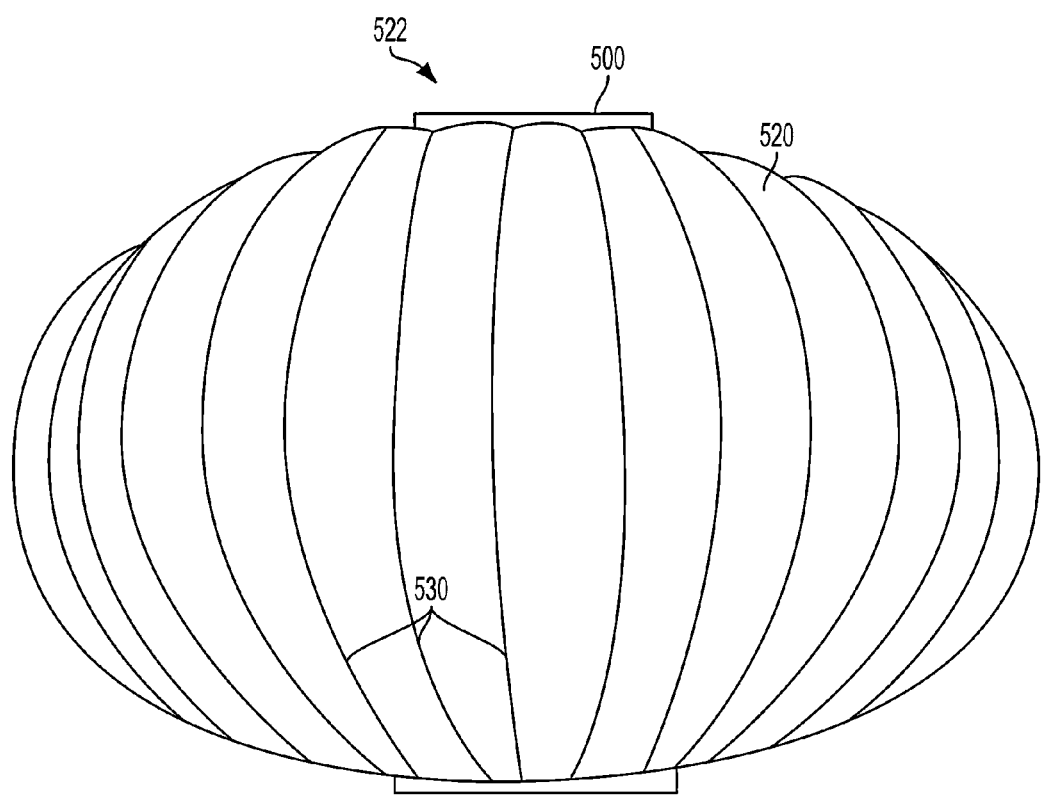
FIG. 7 shows a high-altitude balloon, according to an example embodiment.

FIG. 4 is a simplified diagram illustrating a balloon network that includes super-nodes and sub-nodes, according to an example embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at speeds of 10 to 50 GB/sec or more.

A larger number of balloons may be configured as sub-nodes, which may communicate with ground-based Internet nodes at speeds on the order of approximately 10 MB/sec. Configured as such, the sub-nodes 420 may be configured to connect the super-nodes 410 to other networks and/or to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to the balloon network 400.

4. EXAMPLE APEX FITTING

The present embodiments advantageously provide an apex fitting 500 that may reduce air leaks from and stress on a balloon envelope. FIGS. 5A to 7 show an apex fitting 500 that includes a base plate 510 having a top surface 511 and a bottom surface 512. The base plate 510 may define an opening 515. In a preferred embodiment, the opening 515 of the base plate 510 may be centered in the base plate 510. The opening may alternatively be located off-center within the base plate 510. The base plate 510 may further be configured to be securable to an exterior of a balloon envelope 520 via a single opening 521 in the balloon envelope 520, as described in more detail below. In addition, the base plate 510 may be made from a strong lightweight material, such as aluminum or steel, engineered plastics or composite materials, among other possibilities. In various embodiments, the base plate 510 has a diameter ranging from about 15 inches to about 30 inches. As used herein, "about" means±5%.

At least one stud 525 may be coupled to the base plate 510. In a preferred embodiment, a plurality of studs 525 may be coupled to the base plate 510. Each stud 525 may further be configured to be securable to a tendon 530. For example, a tendon 530 may be looped about a corresponding stud 525. In another preferred embodiment, the plurality of studs 525 may have a spaced-apart arrangement about a periphery of the base plate 510 to substantially evenly distribute the tendons 530 about the periphery of the balloon envelope 520. Further, in one embodiment, each stud 525 may include a body 527 and a flange 526 coupled to the body at a free end. In one embodiment, the flange 526 may comprise a nut with threads defined on an interior surface that may be joined to a stud 525 via mating threads defined on the exterior of the stud 525 at the free end.

The apex fitting 500 may further include a retention ring 535. The retention ring 535 may be used to hold the tendons 530 looped in place over the studs 525. For example, the retention ring 535 may define at least one opening 540 that may be configured to receive a corresponding stud 525. In a preferred embodiment, a plurality of openings 540 are defined in the retention ring 535. In one embodiment, the openings 540 of the retention ring 535 may have a first portion 541 sized to receive the flange 526 of a corresponding stud 525 and a second portion 542 defining a channel or slot having a width that is less than a diameter of the flange 526 of the corresponding stud 525. Further, the second portion 542 of the opening 540 may be configured to receive the body 527 of a corresponding stud. This arrangement allows the retention ring to be rotated relative to the base plate 510 and locked into place. In this locked position, the flange 526 of each stud 525 is aligned over the channel or slot of the second portion 542 of opening 540, preventing the removal of the retention ring 535 from the base plate 510. In a further embodiment, the second portion 542 of the openings 540 may each be configured as a detent that is capable of retaining the body 527 of a corresponding stud 525 once the retention ring 535 has been rotated into the locked position. In various embodiments, the retention ring 535 may be made from a strong lightweight material, such as aluminum or steel, among other possibilities.

In one embodiment, the apparatus further includes at least one locking pin 550 disposed through the retention ring 535 to hold the retention ring 535 in the locked position. In a preferred embodiment, the at least one locking pin 550 includes a plurality of locking pins 550. In various embodiments, the locking pins 550 may include retention screws, rivets or bolts, among others possibilities, disposed through the retention ring 535 and coupled to a fitting 551 in the base plate 510. In various other embodiments, the locking pins 550 may comprise pins or plugs, for example, disposed through the first portion 541 of the plurality of openings 540 of the retention ring 535.

The apex fitting 500 may also include a fill-port body 545 defining a cavity. A flange 546 may be coupled to the fill-port body 545. The flange 546 is preferably located at or near a base of the fill-port body 545. The fill-port body 545 may be arranged coaxially with and extend through the opening 515 of the base plate 510 such that the flange 546 lies adjacent to the bottom surface 512 of the base plate 510. In addition, a locking body 547 may be coupled to the fill-port body 545 to hold the flange 546 against the base plate 510 and/or the balloon envelope 520 (as described below). The locking body 547 may further define an opening arranged coaxially with the fill-port body 545. The fill-port body 545 may extend through the opening of the locking body 547 such that a portion 548 of the locking body 547 lies adjacent to the top surface 511 of the base plate 510. In one embodiment, the locking body 547 may be press-fit onto the fill-port body 545 such that the locking body 547 is received in a detent 549 defined by the fill-port body 545. In another embodiment, the locking body 547 may be press-fit onto the fill-port body 545 such that at least one detent (not shown) defined on the locking body 547 receives at least one protuberance (not shown) coupled to the fill-port body 545. In a further embodiment, the locking body 545 may be coupled to the base plate 510 or the fill-port body 545 via one or more connectors, such as screws 544 or rivets. In yet another embodiment, the locking body 547 may be coupled to the base plate 510 or the fill-port body 545 via adhesive. In a further embodiment, the locking body 547 may include threads (not shown) defined along the opening of the locking body 547, and the fill-port body 545 may include mating threads (not shown) defined along an exterior of the fill-port body 545, such that the locking body 547 may be screwed onto the fill-port body 545. Still other possibilities exist to couple to the locking body 547 to the fill-port body 545 or the base plate without creating additional perforations in the balloon envelope 520.

In one embodiment, the apex fitting 500 further includes a balloon envelope 520. The balloon envelope 520 may define an opening 521 at an apex 522 of the balloon envelope 520. The fill-port body 545 may extend through the opening 521 of the balloon envelope 520 such that a portion 523 of the balloon envelope 520 may be disposed between the flange 546 of the fill-port body 545 and the bottom surface 512 of the base plate 510. In a further embodiment, a gasket (not shown) may be disposed between the flange 546 of the fill-port body 545 and the balloon envelope 520. The purpose of the gasket is to minimize stress on the opening 521 of the balloon envelope 520 and to create a more effective seal between the base plate 510 and the balloon envelope 520.

In one embodiment, the base plate 510 may define one or more apertures 513. In this embodiment, the aperture(s) 513 may take many forms, including a polygonal, a circular or a half moon shape, among other possibilities. In one embodiment, the base plate 510 may include a single aperture (not shown). In another embodiment, the base plate 510 may include a plurality of apertures 513. In further embodiment, shown in FIG. 5A, a plurality of apertures 513 are arranged such that the base plate 510 has a spoke-like configuration.

In another embodiment, the apex fitting 500 may further include a flight termination system (not shown) that is configured to puncture the balloon envelope 520 through at least one aperture 513 of the base plate 510. The flight termination system is of a type known in the art and is configured to vent lift gas by puncturing the balloon envelope 520.

In one embodiment, one or more electrical passages are disposed through a cap 555, where the cap 555 may be removably coupled to the fill-port body 545. These electrical passages may be configured to be coupled to one or more sensors, for example. In one embodiment, these one or more sensors (not shown) may be coupled to the balloon envelope 520 and aligned with at least one of the apertures 513 of the base plate 510. In another embodiment, inductive power and data transfer may be utilized with the one or more sensors via one or more of the apertures 513. The sensor(s) may be configured to measure any number of parameters, for example, temperature, air pressure, lift gas purity or moisture, among other possibilities.

5. ILLUSTRATIVE METHODS

FIG. 8 is a flow chart of a method, according to an example embodiment. Example methods, such as method 800 of FIG. 8, may be carried out by a human operator or a control system for automated manufacturing. A control system may take the form of program instructions stored on a non-transitory computer readable medium and a processor that executes the instructions. However, a control system may take other forms including software, hardware, and/or firmware. Example methods may be implemented as part of the manufacturing or maintenance process for a balloon.

As shown by block 810, method 800 involves providing affixing a base plate to a balloon envelope, where the balloon envelope defines an opening at an apex of the balloon envelope, where the base plate defines an opening, where the opening of the base plate is aligned with the opening of the balloon envelope, and where a plurality of studs are coupled to the base plate. Then at block 820, a fill-port body may be placed through the opening of the balloon envelope and through the opening of the base plate such that a flange of the fill-port body lies adjacent to the balloon envelope. A locking body may then be secured to the fill-port body and/or the base plate, at block 830, such that the locking body lies adjacent to the base plate. At block 840, a plurality of tendons may be secured to the plurality of studs. Then, at block 850, a retention ring may be secured to the base plate.

In one embodiment, securing the retention ring to the base plate may include (i) aligning the first portion of the plurality of openings in the retention ring with the plurality of studs on the base plate, (ii) sliding the retention ring over the flanges of the plurality of studs such that the flanges of the plurality of studs extend through the first portion of the plurality of openings of the retention ring and (iii) rotating the retention ring relative to the base plate such that a body of each of the plurality of studs are received within the second portion of the plurality of openings of the retention ring. In a further embodiment, securing the retention ring to the base plate also includes coupling at least one locking pin to the retention ring.

In another embodiment, securing the lock body to the fill-port body and/or the base plate may include (i) press-fitting the locking body onto the fill-port body such that the locking body is received in a detent defined by the fill-port body, (ii) press-fitting the locking body onto the fill-port body such that at least one detent defined on the locking body receives at least one protuberance defined on the fill-port body, (iii) coupling the locking body to the base plate or the fill-port body via one or more connectors, (iv) coupling the locking body to the base plate or the fill-port body via adhesive, and/or (v) screwing the lock nut onto the fill-port body via threads coupled to the opening of the locking body and mating threads coupled to an exterior of the fill-port body, among other possibilities.

6. CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus, comprising:
   a base plate having a top surface and a bottom surface, wherein the base plate defines an opening, and wherein the base plate is configured to be securable to an exterior of a balloon envelope;
   at least one stud coupled to the base plate, wherein the at least one stud is configured to be securable to a tendon;
   a retention ring defining at least one opening configured to receive the at least one stud;
   a fill-port body defining a cavity, wherein a flange is coupled to the fill-port body, wherein the fill-port body is arranged coaxially with and extends through the opening of the base plate such that the flange lies adjacent to the bottom surface of the base plate; and
   a locking body coupled to the fill-port body, wherein the locking body defines an opening arranged coaxially with the fill-port body, wherein the fill-port body extends through the opening of the locking body such that a portion of the locking body lies adjacent to the top surface of the base plate.

2. The apparatus of claim 1, wherein a flange is coupled to a body of the at least one stud at a free end.

3. The apparatus of claim 2, wherein the at least one opening of the retention ring has a first portion sized to receive the flange of the at least one stud, wherein the at least one opening of the retention ring has a second portion defining a channel having a width that is less than a diameter of the flange of the at least one stud.

4. The apparatus of claim 1, wherein the base plate defines one or more apertures.

5. The apparatus of claim 1, further comprising:
   at least one locking pin disposed through the retention ring.

6. The apparatus of claim 5, wherein the at least one locking pin may comprise two or more retention screws disposed through the retention ring and coupled to the base plate.

7. The apparatus of claim 1, wherein the opening of the base plate is centered in the base plate.

8. The apparatus of claim 1, further comprising:
   a balloon envelope, wherein the balloon envelope defines an opening at an apex of the balloon envelope, wherein the body of the fill port extends through the opening of the balloon envelope such that a portion of the balloon envelope is disposed between the flange of the fill-port body and the bottom surface of the base plate.

9. The apparatus of claim 8, wherein a gasket is disposed between the flange of the fill-port body and the balloon envelope.

10. The apparatus of claim 8, wherein one or more electrical passages are disposed through a cap removably coupled to the fill-port body.

11. The apparatus of claim 8, wherein the base plate defines one or more apertures.

12. The apparatus of claim 11, further comprising: one or more sensors coupled to the balloon envelope and aligned with at least one of the one or more apertures of the base plate.

13. The apparatus of claim 11, further comprising: a flight termination system configured to puncture the balloon envelope through at least one of the one or more apertures of the base plate.

14. The apparatus of claim 11, wherein the one or more apertures of the base plate comprises one aperture, wherein the aperture has a half moon shape.

15. The apparatus of claim 11, wherein the one or more apertures of the base plate comprises a plurality of apertures, wherein the plurality of apertures are arranged such that the base plate has a spoke-like configuration.

16. The apparatus of claim 1, wherein the at least one stud comprises a plurality of studs, wherein the at least one opening of the retention ring comprises a plurality of openings, and wherein the plurality of studs have a spaced-apart arrangement about a periphery of the base plate.

17. A method, comprising:
    affixing a base plate to a balloon envelope, wherein the balloon envelope defines an opening at an apex of the balloon envelope, wherein the base plate defines an opening, wherein the opening of the base plate is aligned with the opening of the balloon envelope, and wherein a plurality of studs are coupled to the base plate;
    placing a fill-port body through the opening of the balloon envelope and through the opening of the base plate such that a flange of the fill-port body lies adjacent to the balloon envelope and opposite a bottom surface of the base plate;
    securing a locking body to the fill-port body, the base plate, or both the fill-port body and the base plate such that the locking body lies adjacent to a top surface of the base plate;
    securing a plurality of tendons to the plurality of studs; and
    securing a retention ring to the base plate via the plurality of studs.

18. The method of claim 17, wherein the retention ring defines a plurality of openings each configured to receive one of the plurality of studs, wherein each of the plurality of openings of the retention ring has a first portion sized to receive a flange of one of the plurality of studs, wherein each of the plurality of openings of the retention ring has a second portion defining a channel having a width that is less than a diameter of the flange of one of the plurality of studs, wherein securing the retention ring to the base plate comprises (i)

aligning the first portion of the plurality of openings in the retention ring with the plurality of studs of the base plate, (ii) sliding the retention ring over the flanges of the plurality of studs such that the flanges of the plurality of studs extend through the first portion of the plurality of openings of the retention ring and (iii) rotating the retention ring relative to the base plate such that a body of each of the plurality of studs are received within the second portion of the plurality of openings of the retention ring.

19. The method of claim 18, wherein securing the retention ring to the base plate further comprises coupling at least one locking pin to the retention ring.

20. The method of claim 17, wherein securing the locking body to the fill-port body, the base plate, or both comprises (i) press-fitting the locking body onto the fill-port body such that the locking body is received in a detent defined by the fill-port body, (ii) press-fitting the locking body onto the fill-port body such that at least one detent defined on the locking body receives at least one protuberance coupled to the fill-port body, (iii) coupling the locking body to the base plate or the fill-port body via one or more connectors, (iv) coupling the locking body to the base plate or the fill-port body via adhesive, or (v) screwing a lock nut onto the fill-port body via threads coupled to the opening of the locking body and mating threads coupled to an exterior of the fill-port body.

* * * * *